(No Model.)

L. SINN.
COOKING POT.

No. 489,041. Patented Jan. 3, 1893.

Witnesses:
John E. Praul.
H. V. Buckley

Inventor:
Louis Sinn
per George E. Buckley
his Atty

UNITED STATES PATENT OFFICE.

LOUIS SINN, OF PHILADELPHIA, PENNSYLVANIA.

COOKING-POT.

SPECIFICATION forming part of Letters Patent No. 489,041, dated January 3, 1893.

Application filed June 1, 1892. Serial No. 435,187. (No model.)

*To all whom it may concern:*

Be it known that I, LOUIS SINN, a subject of the Emperor of Germany, and a resident of Philadelphia, Pennsylvania, have invented a new and Improved Cooking-Pot, of which the following is a description, reference being had to the annexed drawings, making part hereof.

The nature of my invention will appear from the following description and claims.

Figure 1:
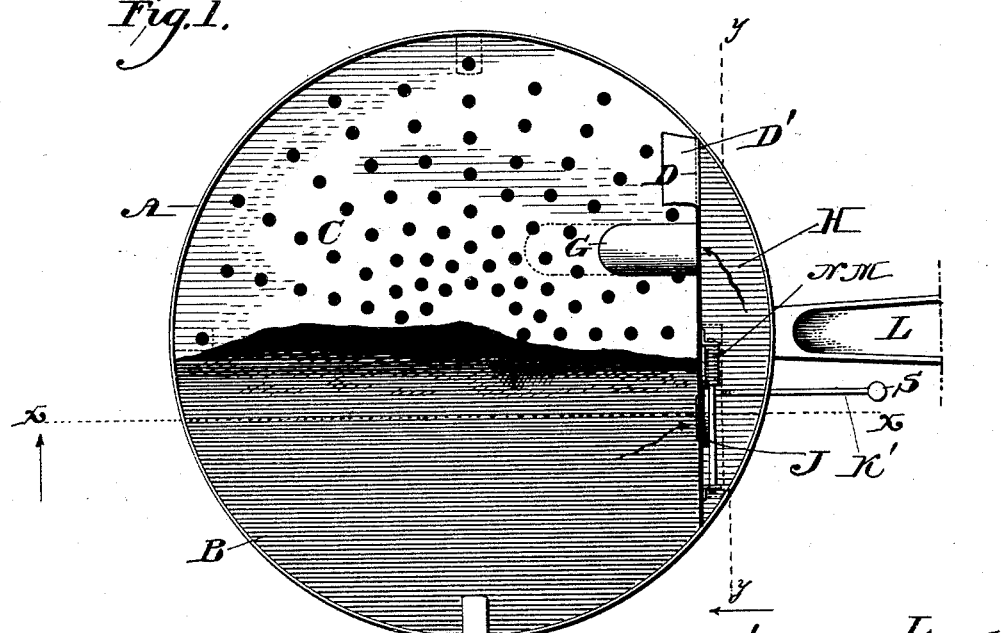
Figure 2:
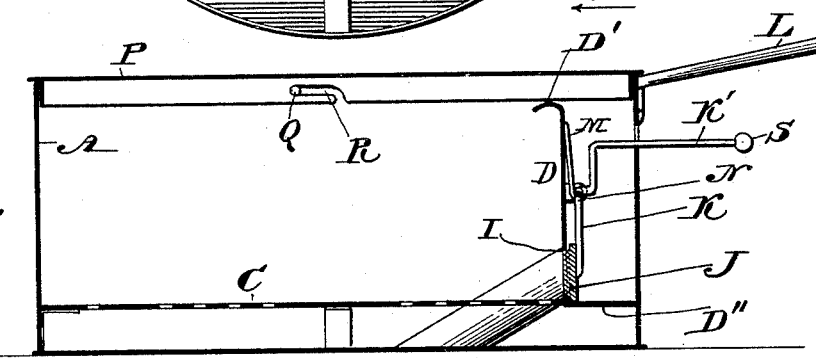
Figure 3:
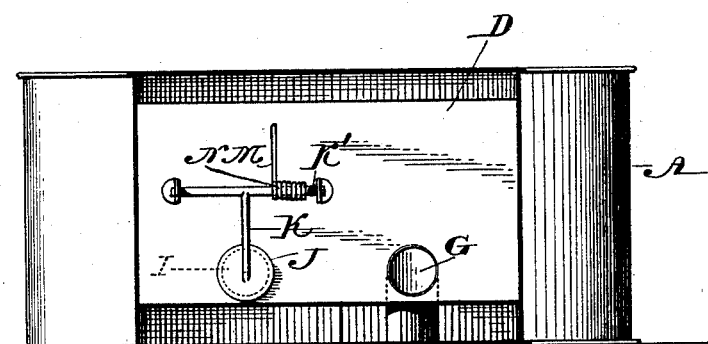

In the drawings:—Figure 1, is a plan view of my invention, partly broken away, showing the perforated false bottom. Fig. 2 a vertical cross sectional view on the line $x\,x$ of Fig. 1. Fig. 3 a vertical cross sectional view on the line $y\,y$ of Fig. 1.

A is the outer shell of the pot. B the true bottom. C a perforated false bottom, resting below on lugs F. D a partition wall forming a chamber H between it and the shell of the pot. D' a curved lip to prevent the boiling water in its ebullition from passing over into chamber H. I an opening in partition wall D closed by valve plate J. K a rod attached to the back of plate J and attached above to the pivotal spiral spring N which is set on bar O and terminates in the prolongation M, which latter sets against the back of wall D. This spring N M, acting on rod K, forces plate J against wall D to close opening I. K' an elongation or arm from rod K, passing through the shell A. L the handle of the pot. P the cover, the lower collar of which engages with a knob Q, projecting from the shell A over which knob it engages in the well known way by means of a slot R.

S is a knob on the end of rod K'. G a tube, passing from the lower part of partition D to bottom B; it opens into chamber H and through bottom B. By pressing knob S rod K operates to throw back plate J and open the hole I thus allowing the hot water to escape into chamber H and to pass therefrom through tube G outside the pot. The pot, which is portable, can thus be freed of water without tilting it. Excess of steam will also escape over and around lip D' into chamber H and out through tube G. It will be observed that wall D terminates below above the bottom B and is provided with a lip or rim D''; which sets against the inner surface of shell A and forms a bottom to chamber H. It will also be noted that tube G passes through the wall D at a point so far above the bottom B as to leave a little water in the bottom of the pot. The false bottom C keeps the material cooked from touching and being burned on the bottom B.

What I claim as new is:—

1. A cooking pot composed of a shell A, inner partition D forming chamber H and provided with opening I; valve plate J to close the latter, spring N M; rod K K' and passage way G from partition D, opening into chamber H and through the true bottom B or to the exterior of the pot; all combined and operating substantially as described.

2. A cooking pot composed of a shell A; inner partition D, provided with opening I and forming a chamber H, terminating below before reaching the bottom B, valve plate J; rod K K'; spring N M; and passage way G, opening from said chamber H to the exterior of the pot; all combined and operating substantially as described.

3. A cooking pot composed of a shell A; inner partition D, provided with opening I and forming a chamber H, valve plate J; rod K K'; spring N M and passage way G, opening to the exterior of the pot from said chamber H, at a point so far above bottom B as to avoid draining all the liquid from the pot when opening I is uncovered; all combined and operating substantially as described.

In witness that the above is my invention I have hereunto set my hand.

LOUIS SINN.

Witnesses:
GEORGE E. BUCKLEY,
HENRY V. BUCKLEY.